(12) United States Patent
Cheng et al.

(10) Patent No.: US 6,819,114 B2
(45) Date of Patent: Nov. 16, 2004

(54) MONITOR HAVING A SELF TESTING CIRCUIT

(75) Inventors: YA-An Cheng, Pa-Te (TW); Hsin-Chung Yang, Chung-Li (TW)

(73) Assignee: Ben Q Corporation, Tao-Yuan Hsien (TW)

( * ) Notice: Subject to any disclaimer, the term of this patent is extended or adjusted under 35 U.S.C. 154(b) by 758 days.

(21) Appl. No.: 09/764,361

(22) Filed: Jan. 19, 2001

(65) Prior Publication Data
US 2001/0023492 A1 Sep. 20, 2001

(30) Foreign Application Priority Data
Mar. 17, 2000 (TW) ....................................... 89104912 A

(51) Int. Cl.[7] .......................... G01R 31/00; G09G 5/00; H04N 17/00
(52) U.S. Cl. ...................... 324/407; 324/537; 345/904; 348/184
(58) Field of Search ............................... 324/404, 407, 324/408, 121 R, 537; 348/180, 181, 184, 189, 191; 345/904; 703/21

(56) References Cited

U.S. PATENT DOCUMENTS

| | | | | |
|---|---|---|---|---|
| 4,220,972 A | * | 9/1980 | Geokezas et al. ........... 348/573 |
| 4,752,825 A | * | 6/1988 | Buckley et al. ............. 348/192 |
| 4,766,493 A | * | 8/1988 | Kim .......................... 348/184 |
| 4,772,948 A | * | 9/1988 | Irvin .......................... 348/177 |
| 5,214,509 A | * | 5/1993 | Okamoto .................... 348/634 |
| 5,781,250 A | * | 7/1998 | Jun ............................ 348/706 |
| 5,886,545 A | * | 3/1999 | Sakuda et al. ............... 327/99 |
| 5,999,148 A | * | 12/1999 | Park ............................ 345/10 |

FOREIGN PATENT DOCUMENTS

| | | |
|---|---|---|
| CN | 1138914 A | 12/1996 |
| EP | 0496580 A2 | 7/1992 |
| JP | 02179680 A | 7/1990 |

* cited by examiner

*Primary Examiner*—Anjan K. Deb
(74) *Attorney, Agent, or Firm*—Winston Hsu

(57) ABSTRACT

A monitor includes a display panel, a displaying circuit, a connector and a self testing circuit. The self testing circuit has a testing signal generator, a switch circuit and a detecting circuit. When the detecting circuit detects the video signals transmitted from the computer, the detecting circuit switches off the switch circuit so as to avoid the testing signal generated from the testing signal generator being transmitted to the input port of the displaying circuit. When no video signals transmitted from the computer are detected, the detecting circuit switches on the switch circuit to allow the testing signal generated from the testing signal generator to be transmitted to the displaying circuit.

11 Claims, 5 Drawing Sheets

MONITOR HAVING A SELF TESTING CIRCUIT

BACKGROUND OF THE INVENTION

1. Field of the Invention

The present invention relates to a monitor. More specifically, the present invention relates to a monitor having a self testing circuit.

2. Description of the Prior Art

Prior art monitor utilizes its OSD (On Screen Display) function and a micro-controller to achieve self testing of the monitor. When a user wants to know if the monitor is in a good operation, he can disconnect the monitor from a computer. If the monitor indicates a message, e.g. "no signal" on the panel successfully to show that no video signals from the computer are received, that means the monitor is not out of function.

When the monitor is disconnected from the computer, the micro-controller of the monitor is not able to receive video signals from the computer. Therefore, the micro-controller activates the OSD function of the monitor to indicate a message, e.g. "no signal" on the panel. If the message is successfully shown on the panel, it means the monitor is not out of function. Otherwise, it means the monitor is out of function.

However, not all monitors are accommodated with a micro-controller or OSD function. Such monitors are not capable of performing self testing function. That is, for those monitors that don't possess micro-controller and OSD function, they are, in general, not able to perform self testing function.

SUMMARY OF THE INVENTION

It is therefore a primary objective of this invention to provide a monitor having a self testing circuit. Self testing function can be achieved even lack of OSD facility and micro-controller in such a monitor.

The monitor according to the present invention comprises a display panel, a displaying circuit, a connector and a self testing circuit. The self testing circuit is electrically connected to an input port of the displaying circuit. It comprises a testing signal, a switch circuit and a detecting circuit. When the detecting circuit detects video signals transmitted from the computer, the detecting circuit switches off the switch circuit so as to avoid the testing signal generated from the testing signal generator being transmitted to the input port of the displaying circuit. When the detecting circuit detects no video signals from the computer, the detecting circuit switches on the switch circuit so as to allow the testing signal generated from the testing signal generator to be transmitted to the displaying circuit.

It is an advantage of the present invention that the monitor can perform self-testing without using OSD or the micro-controller installed therein.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
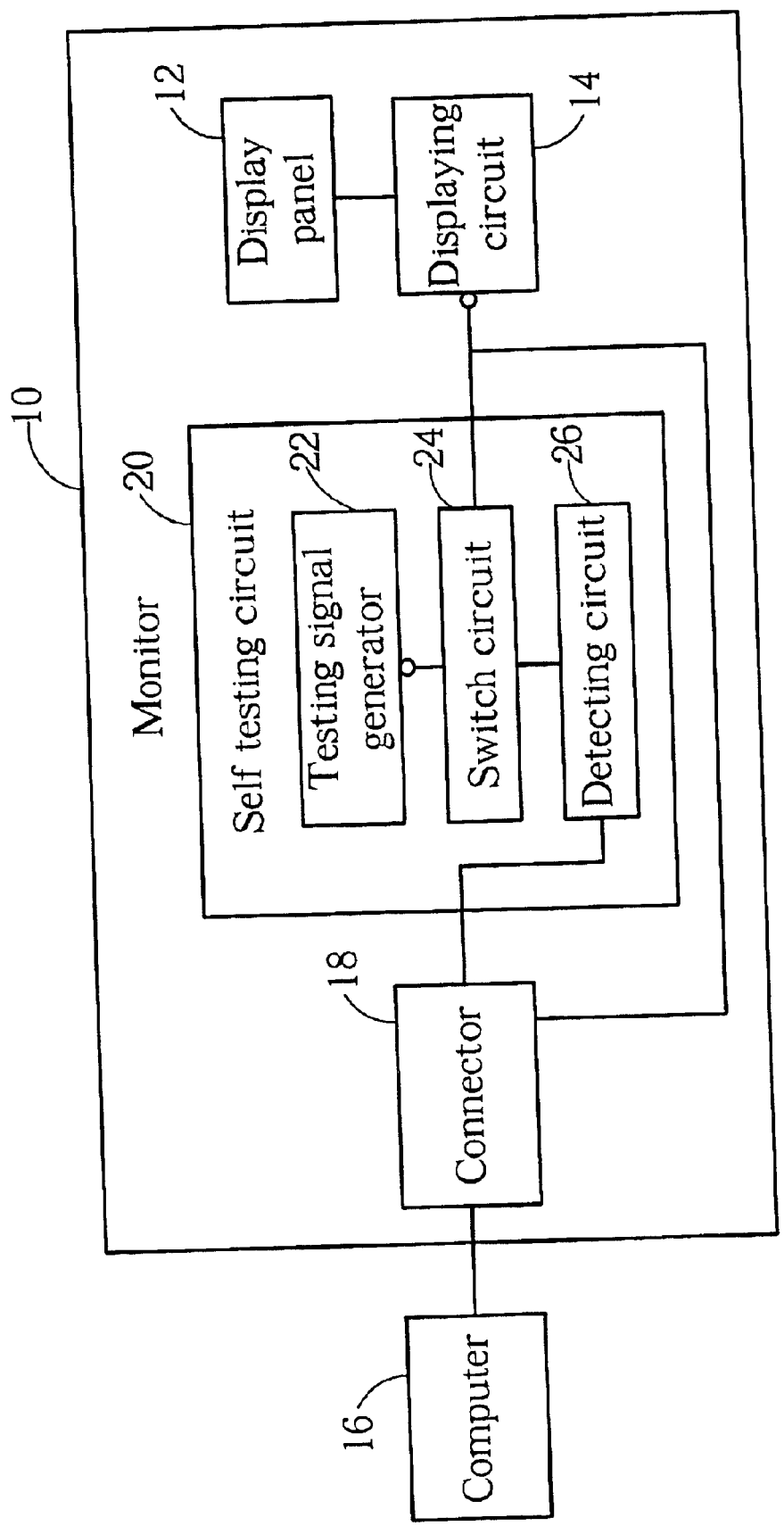
FIG. 1 is the functional block diagram of the monitor according to the present invention.

Please refer to FIG. 1. FIG. 1 is the functional block diagram of the monitor 10 according to the present invention. The monitor 10 comprises a display panel 12 for displaying video images, a displaying circuit 14 for transforming video signals from a computer 16 sequentially into corresponding scanning lines so as to form a corresponding video image on the display panel 12, a self testing circuit 20 electrically connected to an input port of the displaying circuit 14 for performing self testing function, and a connector 18 electrically connected to an input port of the self testing circuit 20 for receiving the video signals transmitted from the computer 16. When the displaying circuit 14 prepares to display each scanning line on the panel, it further depends on an H-BLANK signal to decide when to show this scanning line on the panel 12, so that a plurality of scanning lines can form a corresponding video image.

Figure 2:
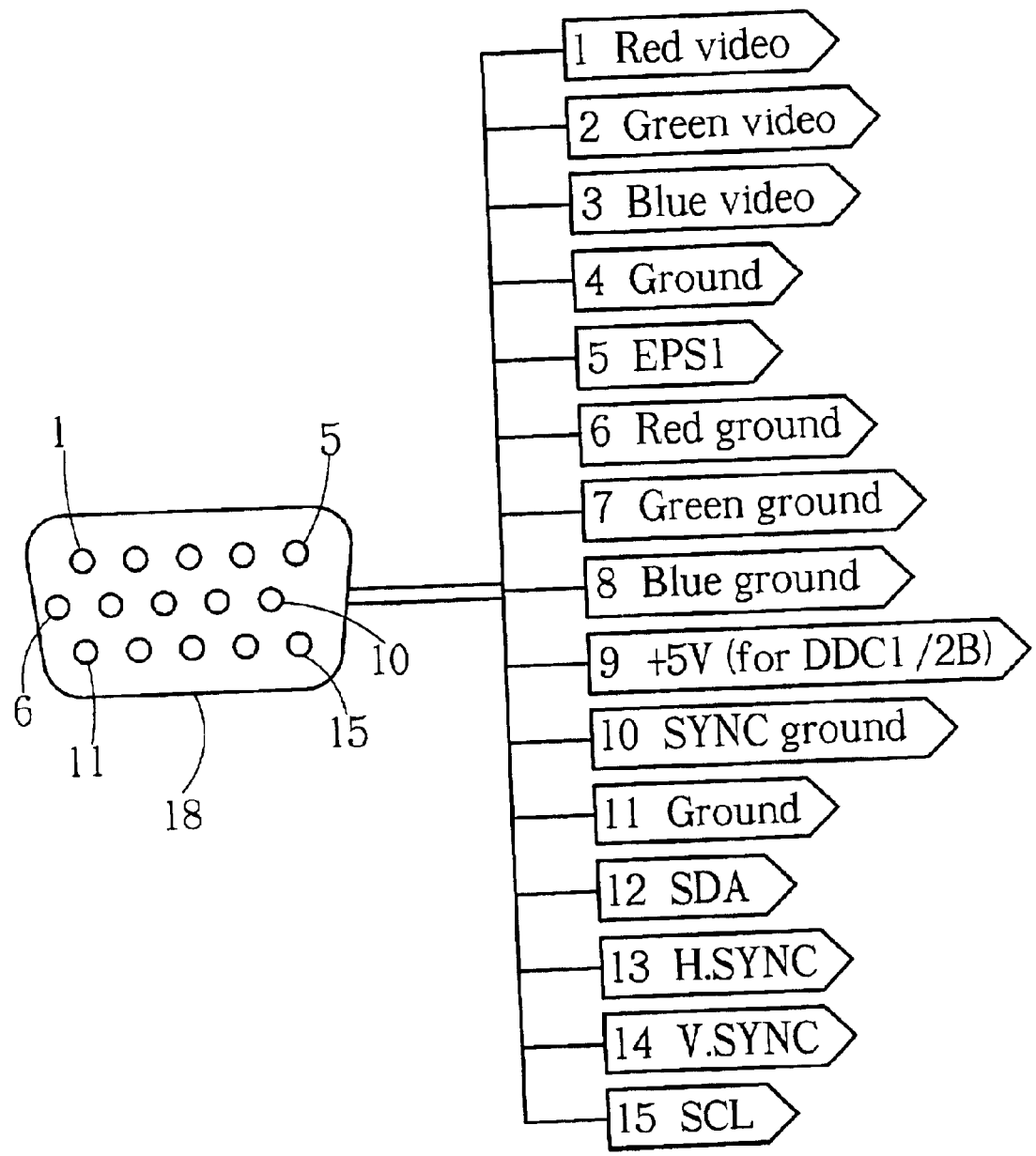
FIG. 2 is a perspective view of the connector and its pin definition.

Please refer to FIG. 2. FIG. 2 is a perspective view of the connector 18 and its pin definition. The connector 18 of the present invention can be a sub-D15 connector, in which the definition of fifteen pins thereon are shown in FIG. 2. The video signals transmitted from the computer 16 are IBM VGA signals, which including an EPS1 sub signal. There is also a corresponding EPS1 pin on the connector 18 for receiving the EPS1 sub signal from the computer 16, which is shown as the fifth pin in FIG. 2.

Figure 3:
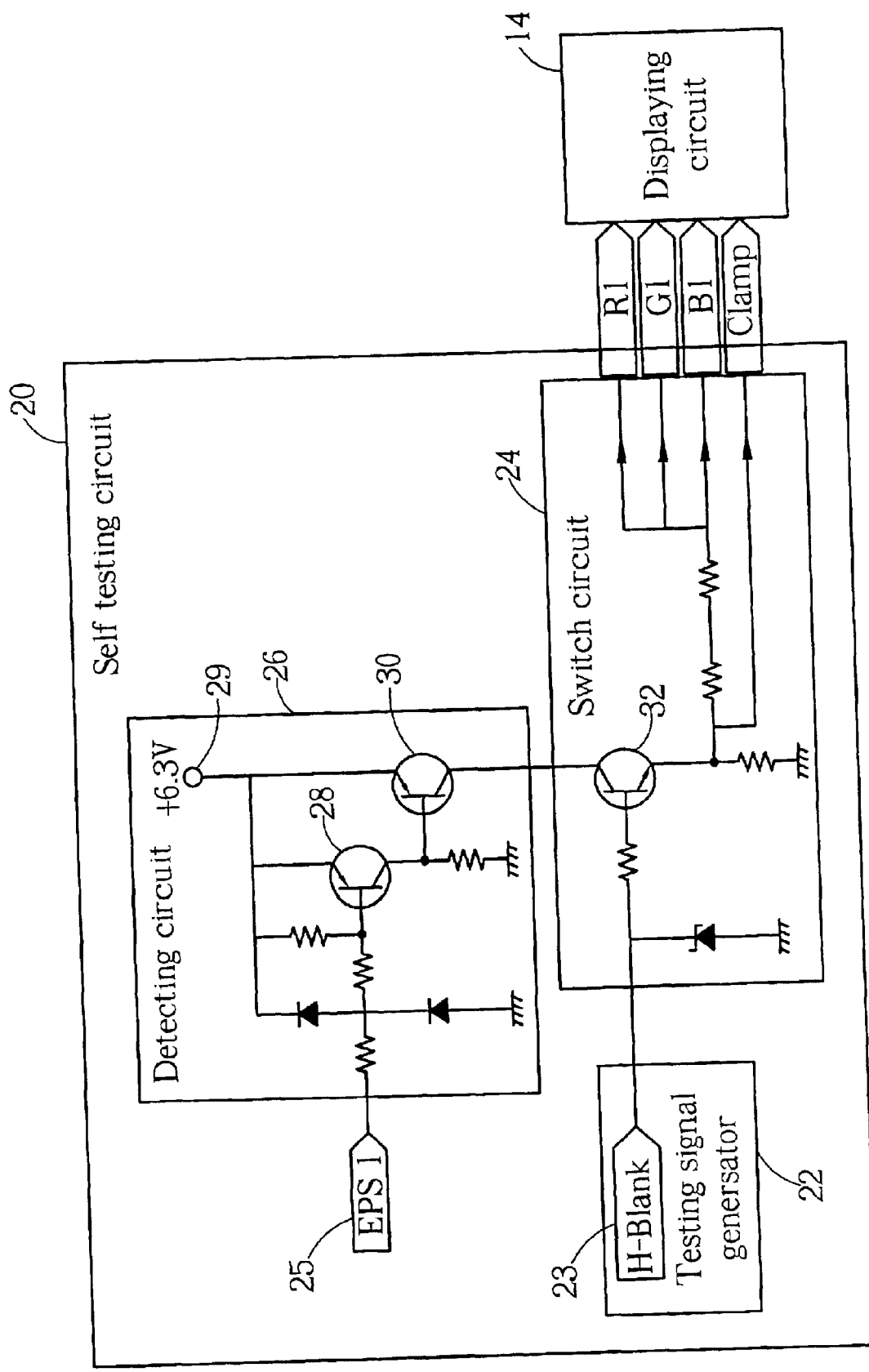
FIG. 3 is a perspective view of the self testing circuit in FIG. 1.

Please refer to FIG. 3. FIG. 3 is a perspective view of the self testing circuit 20 in FIG. 1. The self testing circuit 20 includes a testing signal generator 22 for generating a testing signal to test the monitor 10, a switch circuit 24 electrically connected between an output port of the testing signal generator 22 and the input port of the displaying circuit 14, for controlling output of the testing signal, and a detecting circuit 26 electrically connected to a controlling port of the switch circuit 24 for detecting whether signals transmitted from the computer 16 exist or not, for controlling on/off states of the switch circuit 24.

When the detecting circuit 26 detects the video signals (IBM VGA signals) transmitted from the computer 16, the detecting circuit 26 switches off the switch circuit 24. Consequently, the testing signal generated from the testing signal generator 22 is not able to be transmitted to the input port of the displaying circuit 14 via the switch circuit 24. The connector 18 then input the video signals from the computer 16 into the displaying circuit 14. The displaying circuit 14 would then transform the video signals into a video image and display the video image on the panel 12.

When the detecting circuit 26 detects no video signals transmitted from the computer 16, the detecting circuit 26 switches on the switch circuit 24. The testing signal generated from the testing signal generator 22 is then allowed to transmit to the displaying circuit 14 via the switch circuit 24. The displaying circuit 14 would then transform the testing signal into a testing image and display the testing image on the panel 12. For example, when the testing image is a full-white video image, then it means that the monitor is not out of function. Otherwise, it means that the monitor is out of function.

One of the objectives of the present invention is to allow the self testing function of a monitor which is even not accommodated with the OSD facility or micro-controller. For example, when the monitor passes the self testing, a full-white picture is shown on the panel so as to indicate a user or operator that the monitor is in its good operation. That is, the present invention needs a testing signal, which can substantially demonstrate a full-white picture, just as a full-white video signal can do. However, when processing the self test function, the monitor 10 is disconnected with the computer 16. Such a testing signal, which is capable of demonstrating a full-white picture, would not come from the computer 16, but is generated from the monitor 10 inside. One of the controlling signals, H-BLANK signal, for controlling the displaying circuit 14 in the monitor 10, happens to resemble a full-white video signal and can substantially show a full-white picture. It is therefore convenient to utilize the H-BLANK signal as the necessary testing signal in the present invention.

Figure 4:
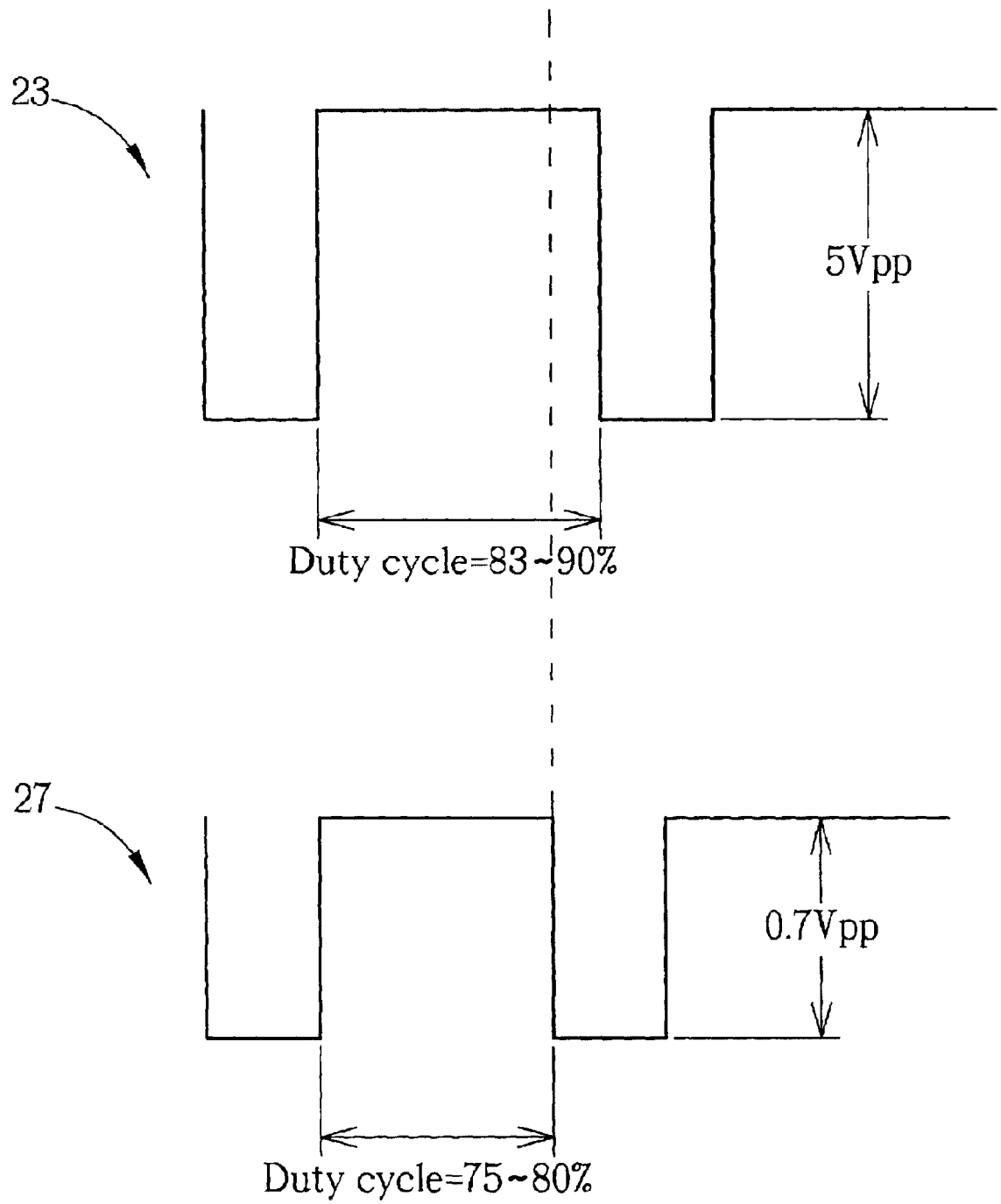
FIG. 4 is a perspective view of the H-BLANK signal and the full-white video image.

Please refer to FIG. 4. FIG. 4 is a perspective view of the H-BLANK signal and the full-white video image. The H-BLANK signal 23 is a control signal for indicating when to display the video image during the horizontal scanning period in the monitor 10. The peak-to-peak amplitude of the H-BLANK signal 23 is about 5 volts, and its duty cycle is about 83%~90%. The peak-to-peak amplitude of a full-white video signal is about 0.7 volts, and its duty cycle is about 75%~80%. As shown in FIG. 4, the waveform of the H-BLANK signal 23 is substantially similar to the waveform of a full-white video signal. The operation of the self testing circuit 20 is not influenced by the difference in the duty cycle. And the difference in the amplitude can be tuned by a simple resistance circuit to adjust the amplitude of the H-BLANK signal 23. Therefore, the H-BLANK signal 23 is available for the required testing signal in the present invention. If the H-BLANK signal 23 is utilized, a full-white picture would be displayed on the panel 12 when the monitor 10 passes the self testing. That is, the H-BLANK signal 23 can be simulated to generate the video signals, such as R1•G1•B1•CLAMP. They can then be transmitted to the displaying circuit 14 in combination or separately. If the monitor 10 is in a good operation, when the simulated R1•G1•B1 or CLAMP signal generated from the testing signal is transmitted to the displaying circuit 14 separately, the display panel 12 would generate corresponding R•G•B video image. When the simulated R1•G1•B1•CLAMP signal are transmitted to the displaying circuit 14 in combination, the display panel 12 would generate a full-white picture. The latter is utilized in the preferred embodiment as a illustration, however, not as a limitation.

As shown in FIG. 3, the detecting circuit of the self testing circuit 20 comprises a first transistor 28 and a second transistor 30. The switch circuit 24 comprises a third transistor 32 to form a controlling port. When the connector 18 is connected with the computer 16, the EPS1 pin 25 of the connector 18 is grounded. The EPS1 pin 25 is connected to the base of the first transistor 28. When the EPS1 pin 25 is grounded, the base of the first transistor 28 is in low voltage and the first transistor 28 is conducted. The first transistor 28 is further connected to the base of the second transistor 30. When the first transistor 28 is conducted, the base of the second transistor 30 is in high voltage and the second transistor 30 is therefore open, which results in the open state of the third transistor 32 in the switch circuit 24. The current from the power 29 is blocked by the third transistor 32, and consequently the testing signal generated by the testing signal generator 22 can not be transmitted to the displaying circuit 14 via the switch circuit 24. When the connector 18 is Disconnected with the computer 16, the EPS1 pin 25 of the connector 18 is floated. The EPS1 pin 25 is connected to the base of the first transistor 28. When the EPS1 pin 25 is floated, the base of the first transistor 28 is in high voltage and the first transistor 28 is open. The first transistor 28 is further connected to the base of the second transistor 30. When the first transistor 28 is open, the base of the second transistor 30 is in low voltage and the second transistor 30 is therefore conducted, which results in the conducting state of the third transistor 32. The current from the power 29 can then pass through the third transistor 32. Consequently, the testing signal generated by the testing signal generator 22 can be transmitted to the displaying circuit 14 via the switch circuit 24. The detecting circuit 26 controls the transmission of the H-BLANK testing signal into the input port of the displaying circuit 14 by controlling the open or conducting state of the controlling port, i.e. the transistor 32, of the switch circuit 24.

Figure 5:
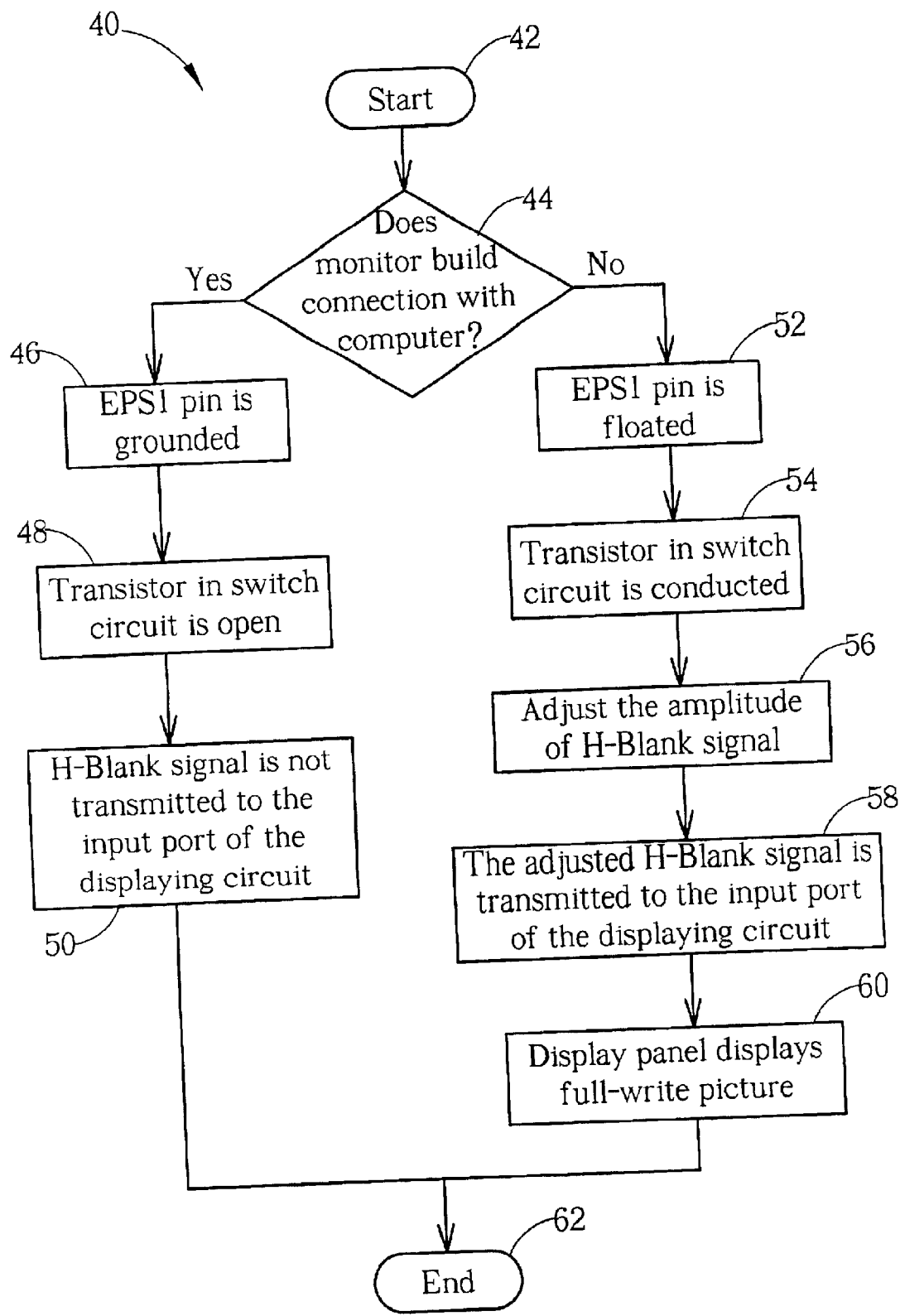
FIG. 5 is a flow chart of simulating video signals to generate video images with the H-BLANK signal according to the present invention.

Please refer to FIG. 5. FIG. 5 is a flow chart 40 of simulating video signals to generate video images with the H-BLANK signal according to the present invention. The flow chart 40 comprises the following steps:

Step 42: Begin;
Step 44: The detecting circuit 26 detects if there are video signals transmitted from the computer 16, so as to judge if the monitor 10 has built connection with the computer 16? If connection is built, go to step 46, otherwise go to step 52;
Step 46: The EPS1 pin 25 of the connector 18 is grounded;
Step 48: The transistor 32 of the switch circuit 24 is open;
Step 50: The H-BLANK signal is not able to be transmitted to the input port of the displaying circuit 14 via the transistor 32, go to step 62;
Step 52: The EPS1 pin 25 of the connector 18 is floated;
Step 54: The transistor 32 of the switch circuit 24 is conducted;
Step 56: The amplitude of the H-BLANK signal is properly adjusted;
Step 58: The adjusted H-BLANK signal is transmitted to the input port of the displaying circuit 14 via the transistor 32;
Step 60: A full-white picture is shown on the display panel 12;
Step 62: End.

Compared with the prior art monitor, the monitor 10 of the present invention comprises a self testing circuit 20 for testing if the monitor is in a good operation. The self testing circuit 20 performs self testing function by means of the EPS1 sub signal contained in the video signals (IBM VGA signals) and the H-BLANK signal generated by the testing signal generator 22. When a user wants to know if the monitor is in a good condition, he can disconnect the monitor from a computer. When the detecting circuit 26 detects no video signals transmitted from the computer 16, the H-BLANK testing signal would be transmitted to the displaying circuit 14 via the switch circuit 24. If a full-white picture is shown on the display panel 12 of the monitor 10, that means the monitor is in a good condition.

Therefore, the monitor according to the present invention can achieve the self testing function even lack of OSD facility or micro-controller.

Those skilled in the art will readily observe that numerous modifications and alterations of the device may be made while retaining the teachings of the invention. Accordingly, the above disclosure should be understood to be limited only by the bounds of the following claims.

What is claimed is:

1. A monitor comprising:

a display panel for displaying video images;

a displaying circuit for transforming video signals transmitted from a computer into a video image and displaying the video image on the display panel;

a connector electrically connected to an input port of the displaying circuit far receiving the video signals transmitted from the computer; and a self testing circuit electrically connected to the input port of the displaying circuit, the self testing circuit comprising:

a testing signal generator for generating a testing signal to test the monitor, the testing signal generator generating the testing signal from an H-BLANK signal such that the testing signal and the H-BLANK signal have substantially similar duty cycles, wherein the testing signal generator transmits the testing signal to the displaying circuit, and the displaying circuit transforms the testing signal into a testing image and displays the testing image on the display panel;

a switch circuit electrically connected between an output port of the testing signal generator and the input port of the displaying circuit, for controlling output of the testing signal; and a detecting circuit electrically connected to a controlling port of the switch circuit for detecting whether signals are transmitted from the computer so as to control on/off states of the switch circuit;

wherein when the detecting circuit detects the video signals transmitted from the computer, the detecting circuit switches off the switch circuit so as to avoid the testing signal generated from the testing signal generator being transmitted to the input port of the displaying circuit, and when no video signals transmitted from the computer are detected, the detecting circuit switches on the switch circuit so as to allow the testing signal generated from the testing signal generator to be transmitted to the displaying circuit.

2. The monitor of claim 1 wherein the connector is a 15 DSUB connector.

3. A self testing circuit installed in a monitor for performing self-testing of the monitor, the monitor comprising a display panel for displaying video images, a displaying circuit for transforming video signals transmitted from a computer into a video image and displaying the video image on the display panel, and a connector electrically connected to an input port of the displaying circuit for receiving the video signals transmitted from the computer, the self testing circuit being electrically connected to the input port of the displaying circuit and comprising:

a testing signal generator for generating a testing signal to test the monitor, the testing signal generator generating the testing signal from an H-BLANK signal such that the testing signal and the H-BLANK signal have substantially similar duty cycles, wherein the testing signal generator transmits the testing signal to the displaying circuit, and the displaying circuit transforms the testing signal into a testing image and displays the testing image on the display panel;

a switch circuit electrically connected between an output port of the testing signal generator and the input port of the displaying circuit, for controlling output of the testing signal; and a detecting circuit electrically connected to a controlling port of the switch circuit for controlling on/off states of the switch circuit;

wherein when the detecting circuit detects that the monitor is connected with the computer, the detecting circuit switches off the switch circuit so as to avoid the testing signal generated from the testing signal generator being transmitted to the input port of the displaying circuit, and when the detecting circuit detects that the monitor is not connected with the computer, the detecting circuit switches on the switch circuit so as to allow the testing signal generated from the testing signal generator to be transmitted to the displaying circuit.

4. The self testing circuit of claim 3 wherein the video signals transmitted from the computer are IBM VGA signals including an EPS1 sub signal, and the connector includes a corresponding EPS1 pin for receiving the EPS1 sub signal, and when detecting that the monitor is connected with the computer, the EPS1 pin is grounded and the detecting circuit switches off the switch circuit, and when detecting that the monitor is not connected with the computer, the EPS1 pin is floated and the detecting circuit switches on the switch circuit so as to allow the testing signal generated from the testing signal generator to be transmitted to the displaying circuit.

5. The self testing circuit of claim 3 wherein the controlling port of the switch circuit is a transistor, and by controlling on/off states of the transistor, the detecting circuit allows the testing signal to be transmitted to the input port of the displaying circuit or not.

6. A simulation method for simulating video signals to generate a video image on a monitor with an H-BLANK signal, the monitor comprising a display panel for displaying video images, and a displaying circuit for sequentially transforming video signals transmitted from a computer into corresponding video scanning lines, the displaying circuit deciding the timing of displaying a video scanning line on the display panel according to a testing signal so as to form a corresponding video image out of a plurality of video scanning lines, the simulation method comprising steps of:

generating the testing signal from the H-BLANK signal by adjusting the amplitude of the H-BLANK signal, the testing signal and the H-BLANK signal having substantially similar duty cycles;

detecting whether the monitor is connected with the computer; and if the monitor is not connected with the computer, transmitting the testing signal to the displaying circuit so as to simulate video signals from the computer and generate corresponding video images.

7. The simulation method of claim 6 wherein the monitor further comprises a switch circuit and the testing signal is transmitted to an input port of the displaying circuit via the switch circuit, and when detecting that the monitor is connected with the computer, the switch circuit will be switched off to avoid the testing signal from being transmitted to the input port of the displaying circuit, and when detecting that the monitor is not connected with the computer, the switch circuit will be switched on so that the testing signal can be transmitted to the input port of the displaying circuit.

8. The method of claim 6 wherein the waveform of the testing signal is substantially similar to the waveform of a full-white video signal so that when the testing signal is transmitted to the input port of the displaying circuit, the display panel displays a full-white video image.

9. A simulation method for simulating video signals to generate a video image on a monitor with an H-BLANK signal, the monitor comprising a display panel for displaying video images, and a displaying circuit for sequentially transforming video signals transmitted from a computer into corresponding video scanning lines, the displaying circuit deciding the timing of displaying a video scanning line on the display panel according to a testing signal so as to form a corresponding video image Out of a plurality of video scanning lines, the simulation method comprising steps of:

generating the testing signal from the H-BLANK signal by adjusting the amplitude of the H-BLANK signal, the testing signal and the H-BLANK signal having substantially similar duty circles;

detecting whether video signals are transmitted from the computer; and if no signals transmitted from the computer are detected, transmitting the testing signal to the displaying circuit so as to simulate video signals from the computer and generate corresponding video images.

10. The simulation method of claim 9 wherein the monitor further comprises a switch circuit and the testing signal is transmitted to an input port of the displaying circuit via the switch circuit, and when signals transmitted from the computer are detected, the switch circuit will be switched off to avoid the testing signal from being transmitted to the input port of the displaying circuit, and when no signals transmitted from the computer are detected, the switch circuit will be switched on so that the testing signal can be transmitted to the input port of the displaying circuit.

11. The method of claim 9 wherein the waveform of the testing signal is substantially similar to the waveform of a full-white video signal so that when the testing signal is transmitted to the input port of the displaying circuit, the display panel displays a full-white video image.

\* \* \* \* \*